(12) United States Patent
Masschelein et al.

(10) Patent No.: US 11,397,293 B1
(45) Date of Patent: Jul. 26, 2022

(54) ILLUMINATED LIGHT TRANSMITTING PANEL WITH PHASE-SEPARATED GLASS

(71) Applicants: Peter F. Masschelein, Campbell, CA (US); Clarisse Mazuir, San Jose, CA (US); Yuan Chen, San Jose, CA (US); David E. Kingman, San Jose, CA (US); Lai Wang, Fremont, CA (US)

(72) Inventors: Peter F. Masschelein, Campbell, CA (US); Clarisse Mazuir, San Jose, CA (US); Yuan Chen, San Jose, CA (US); David E. Kingman, San Jose, CA (US); Lai Wang, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/372,426

(22) Filed: Jul. 10, 2021

Related U.S. Application Data (60) Provisional application No. 63/070,018, filed on Aug. 25, 2020.

(51) Int. Cl.
 *F21V 8/00* (2006.01)
(52) U.S. Cl.
 CPC ......... *G02B 6/0041* (2013.01); *G02B 6/0065* (2013.01); *G02B 6/0073* (2013.01)
(58) Field of Classification Search
 CPC ... G02B 6/0041; G02B 6/0065; G02B 6/0073
 See application file for complete search history.

(56) References Cited

U.S. PATENT DOCUMENTS

| | | | |
|---|---|---|---|
| 6,144,424 A | 11/2000 | Okuda et al. | |
| 6,646,772 B1 | 11/2003 | Popovich et al. | |
| 7,433,565 B2 | 10/2008 | Joseph et al. | |
| 7,947,793 B2 | 5/2011 | Marchand et al. | |
| 7,990,605 B2 | 8/2011 | Okuyama et al. | |
| 8,431,943 B2 * | 4/2013 | Nakamura | H01L 51/56 438/37 |

(Continued)

FOREIGN PATENT DOCUMENTS

| DE | 102011016430 A1 * | 10/2012 | ............. B60K 35/00 |
|---|---|---|---|
| WO | WO-2006065049 A1 * | 6/2006 | ............. B32B 17/06 |

(Continued)

OTHER PUBLICATIONS

Buff, A., "A Study of Crystallization Behavior in Phase Separated Chalcogenide Glasses" (2016), Electronic Theses and Dissertations, 2004-2019. 5140. https://stars.library.ucf.edu/etd/5140 (125 pp).

(Continued)

*Primary Examiner* — Mary Ellen Bowman
(74) *Attorney, Agent, or Firm* — Young Basile Hanlon & MacFarlane, P.C.

(57) ABSTRACT

A light transmitting panel includes a lighting device and a light guide layer. The lighting device emits an input light. The light guide layer is formed from a phase separated glass material that includes a first material phase and a second material phase, wherein the first material phase functions to guide the input light along the light guide layer and the second material phase functions to scatter the input light so that at least part of the input light is directed out of the light guide layer as an output light.

22 Claims, 6 Drawing Sheets

(56) References Cited

U.S. PATENT DOCUMENTS

| | | | |
|---|---|---|---|
| 9,585,548 B2* | 3/2017 | James, III | C03C 3/093 |
| 2002/0167016 A1* | 11/2002 | Hoelen | G02B 6/0068 257/89 |
| 2015/0124480 A1* | 5/2015 | Baker | G02B 6/0065 362/613 |
| 2015/0370390 A1 | 12/2015 | Takahashi et al. | |
| 2016/0264451 A1* | 9/2016 | He | C03C 15/00 |

FOREIGN PATENT DOCUMENTS

| | | | | |
|---|---|---|---|---|
| WO | WO-2010035050 A1 * | 4/2010 | | G02B 6/0036 |
| WO | 2015186584 A1 | 12/2015 | | |

OTHER PUBLICATIONS

Schuller, S., "Phase Separation in Glass", Research Gate, https://www.researchgate.net/publication/323692362, Chapter—Mar. 2018 (24 pp).

glassproperties.com, "Phase Separation in Borosilicate and Alkali Earth Silicate Glasses", https://glassproperies.com/phase-separation, Downloaded Jul. 13, 2020 (5 pp).

* cited by examiner

ILLUMINATED LIGHT TRANSMITTING PANEL WITH PHASE-SEPARATED GLASS

CROSS-REFERENCE TO RELATED APPLICATIONS

This application claims the benefit of U.S. Provisional Application No. 63/070,018, filed on Aug. 25, 2020, the content of which is hereby incorporated by reference in its entirety for all purposes.

TECHNICAL FIELD

This disclosure relates generally to illuminated light transmitting panels that include phase separated glass.

BACKGROUND

Light transmitting panels such as those made of glass, polycarbonate, plastic, composite, or other light-transmissive material, have optical properties that determine functionality of the panel, such as panel transmittance. Properties of components in a laminated light transmitting panel or can enable optical functions such as guiding light through the light transmitting panel from a light source that is located at an edge of the light transmitting panel. The light may be emitted from a surface of the light transmitting panel, such as by scattering.

SUMMARY

A first aspect of the disclosure is a light transmitting panel that includes a lighting device and a light guide layer. The lighting device emits an input light. The light guide layer is formed from a phase separated glass material that includes a first material phase and a second material phase, wherein the first material phase functions to guide the input light along the light guide layer and the second material phase functions to scatter the input light so that at least part of the input light is directed out of the light guide layer as an output light.

In some implementations of light transmitting panel according to the first aspect of the disclosure, the light guide layer includes a peripheral edge, a first surface, and a second surface. The input light enters the light guide layer at the peripheral edge of the light guide layer, and the output light exits the light guide layer at one of the first surface or the second surface.

In some implementations of light transmitting panel according to the first aspect of the disclosure, the first material phase and the second material phase have different indices of refraction. The second material phase may define microstructures that are suspended in the first material phase. The second material phase may define droplet-type microstructures in the first material phase. The second material phase may define spinodal-type microstructures in the first material phase.

In some implementations of light transmitting panel according to the first aspect of the disclosure, the light guide layer is formed from a borosilicate glass material. In some implementations of light transmitting panel according to the first aspect of the disclosure, the light guide layer is at least one of transparent or translucent.

In some implementations of light transmitting panel according to the first aspect of the disclosure, the light guide layer is part of a window, a first surface of the light guide layer is oriented toward an exterior environment, and a second surface of the light guide layer is oriented toward an interior environment.

In some implementations of light transmitting panel according to the first aspect of the disclosure, the light guide layer includes a peripheral edge, the light guide layer includes a first surface, the light guide layer includes a second surface, the first surface is spaced from the second surface by a thickness dimension of the light guide layer, the input light enters the light guide layer at the peripheral edge of the light guide layer, the output light exits the light guide layer at one of the first surface or the second surface, the first material phase and the second material phase have different indices of refraction, the second material phase defines microstructures that are suspended in the first material phase, the light guide layer is at least one of transparent or translucent, and the lighting device includes light-emitting diodes that are located adjacent to the peripheral edge of the light guide layer.

A second aspect of the disclosure is a light transmitting panel that includes a first external glass layer, a second external glass layer, a first low refractive index layer, a second low refractive index layer, a lighting device, and a light guide layer. The first low refractive index layer is located between the first external glass layer and the second external glass layer. The second low refractive index layer is located between the first external glass layer and the second external glass layer. The lighting device emits an input light. The light guide layer is located between the first low refractive index layer and the second low refractive index layer. The light guide layer is formed from a phase separated glass material that includes a first material phase and a second material phase. The first material phase functions to guide the input light along the light guide layer. The second material phase functions to scatter the input light so that at least part of the input light is directed out of the light guide layer as an output light.

In some implementations of the light transmitting panel according to the second aspect of the disclosure, the light transmitting panel also includes a first interlayer between the first low refractive index layer and the first external glass layer and a second interlayer between the second low refractive index layer and the second external glass layer.

In some implementations of the light transmitting panel according to the second aspect of the disclosure, the light guide layer includes a peripheral edge, a first surface, and a second surface, the input light enters the light guide layer at the peripheral edge of the light guide layer, and the output light exits the light guide layer at one of the first surface or the second surface.

In some implementations of the light transmitting panel according to the second aspect of the disclosure, the first material phase and the second material phase have different indices of refraction. In some implementations of the light transmitting panel according to the second aspect of the disclosure, the second material phase defines microstructures that are suspended in the first material phase. In some implementations of the light transmitting panel according to the second aspect of the disclosure, the second material phase defines droplet-type microstructures in the first material phase. In some implementations of the light transmitting panel according to the second aspect of the disclosure, the second material phase defines spinodal-type microstructures in the first material phase.

In some implementations of the light transmitting panel according to the second aspect of the disclosure, the first external glass layer, the second external glass layer, the first low refractive index layer, the second low refractive index layer, and the light guide layer are each at least one of transparent or translucent.

A third aspect of the disclosure is an assembly that includes a structure, and a light transmitting panel that is connected to the structure so that the structure and the light transmitting panel cooperate to define a barrier between an outside environment and an inside environment. The light transmitting panel includes a lighting device that emits an input light and a light guide layer. The light guide layer that is formed from a phase separated glass material that includes a first material phase and a second material phase, wherein the first material phase functions to guide the input light along the light guide layer and the second material phase functions to scatter the input light so that at least part of the input light is directed out of the light guide layer as an output light.

In some implementations of the light transmitting panel according to the third aspect of the disclosure, the light guide layer includes a peripheral edge, the light guide layer includes a first surface, the light guide layer includes a second surface, the first surface is spaced from the second surface by a thickness dimension of the light guide layer, the input light enters the light guide layer at the peripheral edge of the light guide layer, the output light exits the light guide layer at one of the first surface or the second surface, the first material phase and the second material phase have different indices of refraction, the second material phase defines microstructures that are suspended in the first material phase, the light guide layer is at least one of transparent or translucent, and the lighting device includes light-emitting diodes that are located adjacent to the peripheral edge of the light guide layer.

DETAILED DESCRIPTION

Light transmitting panels for use in architectural applications, vehicle applications, and other applications can be formed from laminated glass or other light-transmissive materials layered with various optical components.

To illuminate a light transmitting panel, a lighting device is place along an edge of the light transmitting panel and light that is emitted by the lighting device passes into a light guide that is included in the light transmitting panel. The light is carried through the light guide by total internal reflection. Light is emitted from the light guide by causing the light to refract out of the light guide. A light extraction structure is used to refract light out of the light guide. One example of a light extraction structure is an extraction layer that includes a scattering material. The light extraction layer is separate from the light guide. Thus, a typical implementation may include a light guide layer and a light extraction layer. For example, when a portion of the emitted light passes into the light extraction layer and strikes a particle of a scattering material, it is reflected or refracted by the scattering material. This changes the angle of the light so that it passes out of the light transmitting panel.

In the light transmitting panels that are described herein, a light guide layer is formed from a phase separated material. The phase separated material includes a first material phase that conducts light along the light guide layer. The phase separated material includes a second material phase that refracts light out of the light guide layer. The light transmitting panels that are described herein may omit a separate light extraction layer because the light extraction function is performed by the second material phase of the light guide layer.

Figure 1:
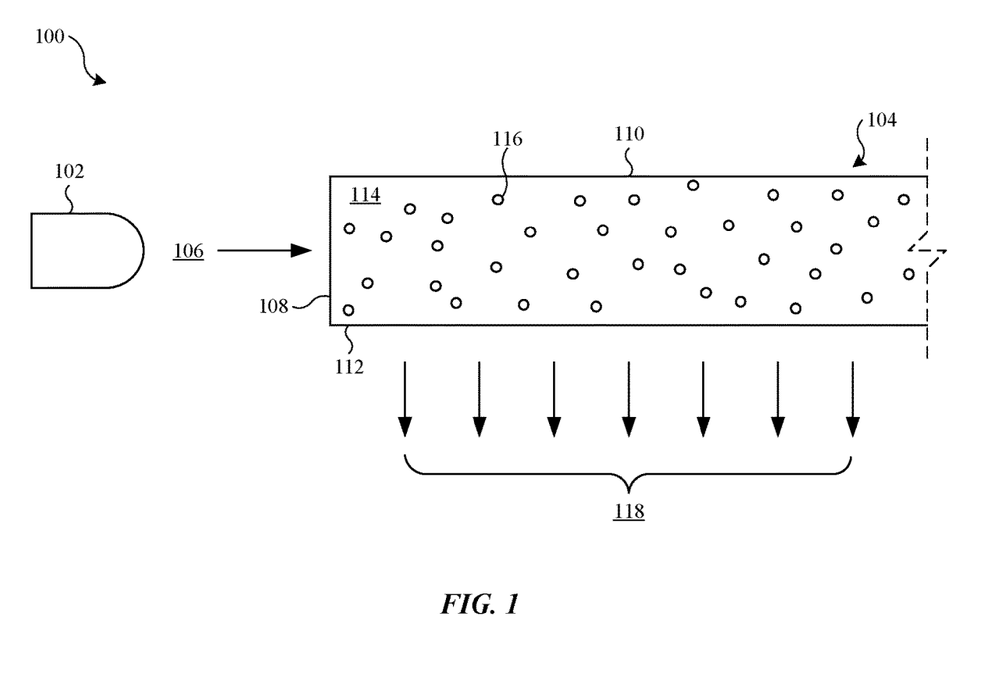
FIG. 1 is a side cross-section view schematic illustration of an example of an illuminated light transmitting panel.

FIG. 1 is a side cross-section view schematic illustration that shows a panel 100, which is an example of an illuminated light transmitting panel. The panel 100 includes a lighting device 102 and a light guide layer 104.

The lighting device 102 is positioned adjacent to the light guide layer 104 and is configured to emit light. The emitted light from the lighting device 102 is represented in the illustrated example as input light 106. The lighting device 102 is oriented so that a portion of the input light 106 is incident on the light guide layer 104 and enters the light guide layer 104 so that it is conducted through a portion of the light guide layer 104 by total internal reflection, as will be discussed further herein.

The lighting device 102 is a convention lighting device, such as an electric lamp of any type. As an example, the lighting device 102 may be a light emitting diode. The lighting device 102 may include multiple individual lighting components (e.g., electric lamps, light emitting diodes, etc.). As an example, the lighting device 102 may include multiple light emitting diodes arranged in a linear array. The lighting device 102 may include additional structures including, for example, a housing, an opaque cover, a reflector, and/or other components. The lighting device 102 may be connected to or include a source of electrical power such as a building's electrical distribution system, a vehicle's electrical distribution system, or a battery. The panel 100 may include multiple lighting devices that are each similar to the lighting device 102.

The light guide layer 104 has a peripheral edge 108, a first surface 110 (e.g., an upper surface or an outer surface), and a second surface 112 (e.g., a lower surface or an inner surface). The first surface 110 and the second surface 112 extend generally transverse to a thickness dimension of the light guide layer 104. The thickness dimension is the smallest dimension of the light guide layer 104. The peripheral edge 108 extends between the first surface 110 and the second surface 112, has a height that is similar to the thickness dimension of the light guide layer 104, and extends around the outer peripheries of the first surface 110 and the second surface 112.

The light guide layer 104 is transparent or translucent, so that light may pass through the light guide layer 104, for example, by entering at the first surface 110, traveling through the light guide layer 104 generally in the direction of the thickness dimension, and exiting at the second surface. This allows the light guide layer 104 to be used, for example, as a part of a window in an architectural application or a vehicle application, with the first surface 110 oriented toward an exterior environment and with the second surface 112 oriented toward an interior environment.

The light guide layer 104 is formed from a phase separated glass material that includes a first material phase 114 and a second material phase 116. The first material phase 114 functions to conduct the input light 106 from the lighting device 102 along the light guide layer 104, in a direction that is generally transverse to the thickness dimension, by total internal reflection within the light guide layer 104 between the first surface 110 and the second surface 112. The second material phase 116 functions to scatter the input light 106 so that at least part of the input light 106 is directed out of the light guide layer 104 through one of the first surface 110 or the second surface 112 as output light 118.

Phase separation occurs in certain glass materials as a function of composition and heat treatment. As one example, soda-borosilicate glass materials may separate into a silica-rich phase and a borate-rich phase upon heat treatment. Heat treatment of glass materials that are prone to phase separation is typically controlled to avoid phase separation because it can introduce scattering, with the result being a reduction in the optically clear quality of the material.

Phase separation is deliberately induced when forming the light guide layer 104 in order to define the first material phase 114 and the second material phase 116 in order to provide light scattering structures that are defined by the second material phase and function to refract light out of the light guide layer 104. Thus, the second material phase 116 performs a light extraction function and, therefore, the light guide layer 104 may omit a light extraction layer that is separate from the remainder of the light guide layer 104.

The first material phase 114 and the second material phase 116 of the light guide layer 104 have different refractive indices. The difference in refractive index between the first material phase 114 and the second material phase 116 makes light extraction possible by the scattering that is caused when the emitted light strikes a phase boundary between the first material phase 114 and the second material phase 116 where the refractive index changes.

For efficient light guide functionality, the light guide layer 104 is placed adjacent to a material that has a lower refractive index than an effective refractive index of the light guide layer 104. In the example of FIG. 1, the light guide layer 104 is adjacent to air. In alternative implementations, the light guide layer 104 is adjacent to solid materials that have a lower refractive index than an effective refractive index of the light guide layer 104. These layers of material may be referred to as low refractive index layers. Materials that can be used for low refractive index layers that are positioned adjacent to the light guide layer include, air, optically clear adhesives, and low refractive index plastic films.

The first material phase 114 may be the primary material of the light guide layer 104 and form a majority of the light guide layer 104 by volume. The second material phase 116 may form a lower amount of the total volume of the light guide layer 104. The second material phase 116 may define microstructures in the first material phase 114. The second material phase 116 may be in the form of a large number of separately formed (e.g., discontinuous) microstructures that are suspended in the first material phase 114.

In an example in which the light guide layer 104 is formed from phase separated borosilicate glass, the first material phase 114 may be a silica-rich phase and the second material phase 116 may be a borate rich phase. The light guide layer 104 may, however, be formed using glass compositions other than borosilicate glass.

Figure 2:
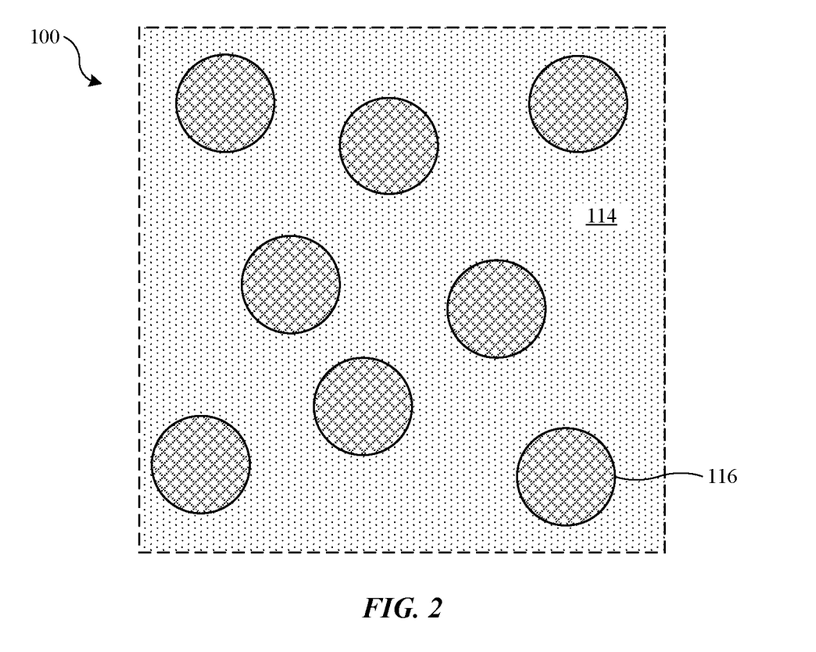
FIG. 2 is a detail view of an example of the light guide layer of the illuminated light transmitting panel.
Figure 3:
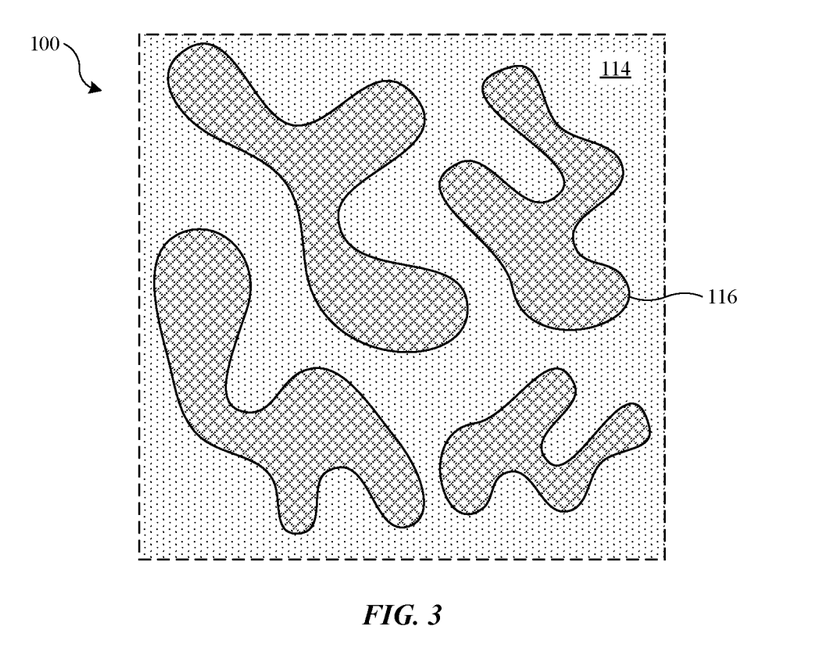
FIG. 3 is a detail view of an example of the light guide layer of the illuminated light transmitting panel.

FIG. 2 is a detail view that shows an example of the light guide layer 104 in which the second material phase 116 is defined by droplet-type microstructures that are formed in the first material phase 114. FIG. 3 is a detail view that shows an example of the light guide layer 104 in which the second material phase 116 is defined by spinodal-type microstructures that are formed in the first material phase 114.

Figure 4:
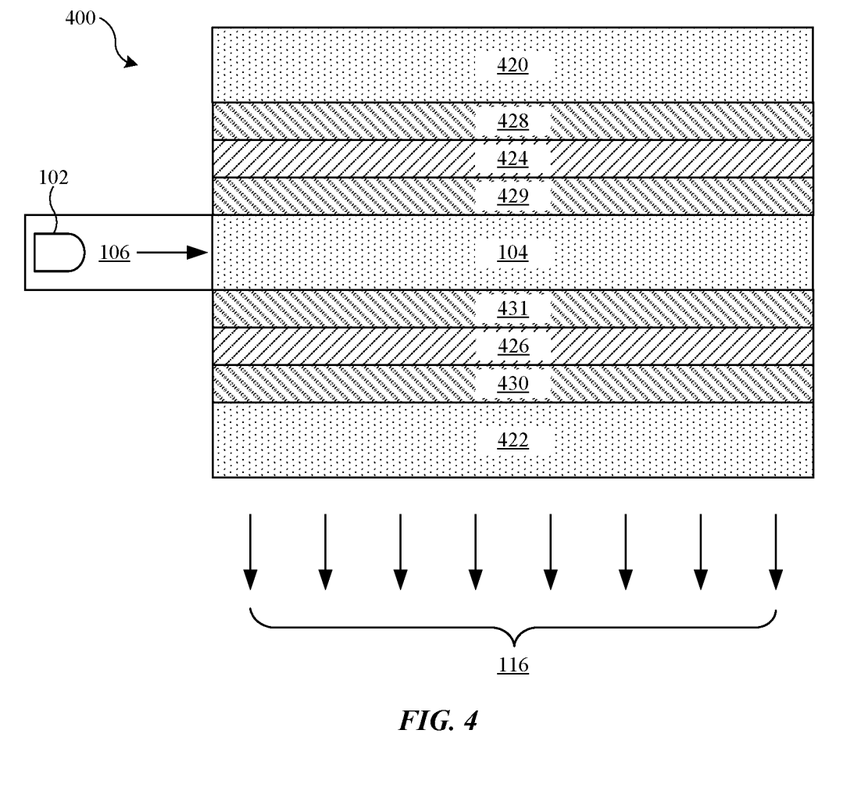
FIG. 4 is a side cross-section view schematic illustration of an example of an illuminated light transmitting panel.

FIG. 4 is a side cross-section view schematic illustration that shows a panel 400, which is an example of an illuminated light transmitting panel. The panel 400 includes the lighting device 102, the light guide layer 104, a first external glass layer 420, a second external glass layer 422, a first low refractive index layer 424, a second low refractive index layer 426, a first interlayer 428, and a second interlayer 430. The panel 400 may also include a third interlayer 429 and a fourth interlayer 431.

The panel 400 includes the lighting device 102 and the light guide layer 104, the structure and function of the lighting device 102 and the light guide layer 104 is as previously described. When incorporated in the panel 400, the input light 106 is emitted by the lighting device 102, is guided through the light guide layer 104, and exits the light guide layer 104 as the output light 118. The output light 118 passes through the other layers of the panel 400 before reaching an environment that is external to the panel 400. In the illustrated example, the emitted light passes through the first low refractive index layer 424 and a first external glass layer 420 before reaching the environment on a first side of the panel 400 and/or passes through the second low refractive index layer 426 and the second external glass layer 422 before reaching the environment on a second side of the panel 400.

The panel 400 is a light transmissive panel that is suitable for use as a window. Thus, the first external glass layer 420, the second external glass layer 422, the first low refractive index layer 424, the second low refractive index layer 426, the first interlayer 428, the second interlayer 430, the third interlayer 429, and the fourth interlayer 431 are each formed from transparent or translucent materials (e.g., high transmissivity for light in the visible spectrum).

The first external glass layer 420 and the second external glass layer 422 can be formed from conventional materials that are typical used in windows. Examples of suitable materials include glass and clear plastics.

Figure 5:
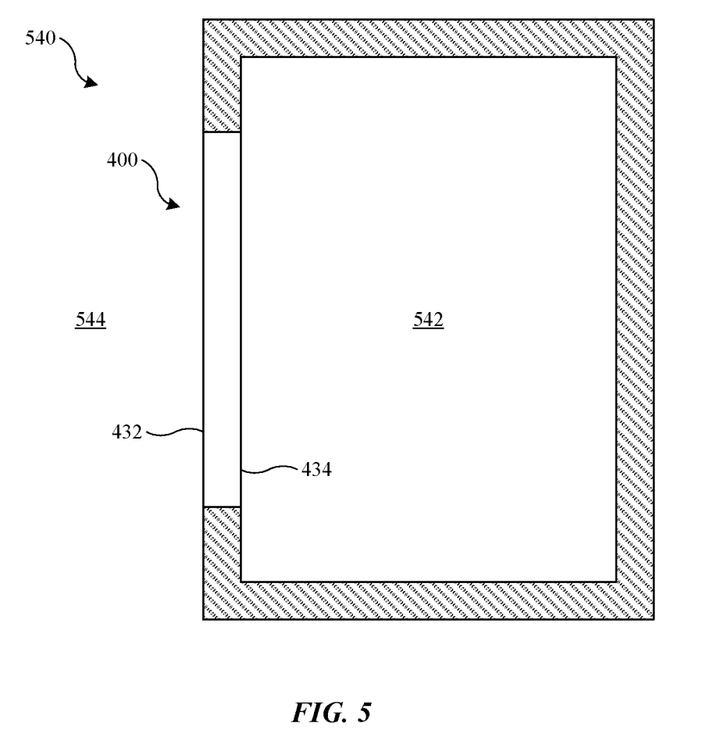
FIG. 5 is a schematic illustration of the panel of FIG. 4 incorporated in a structure.

The first external glass layer 420 and the second external glass layer 422 are located at the exterior of the panel 400. The first external glass layer 420 defines a first external surface 432 of the panel 400 and the second external glass layer 422 defines a second external surface 434 of the panel 400. The first external surface 432 and the second external surface 434 of the panel 400 are the large surfaces of the panel 400, extend generally transverse to a thickness dimension of the panel 400, and are bounded by an outer periphery of the panel 400. As an example, FIG. 5 is a schematic illustration that shows the panel 400 incorporated in a structure 540, which may be part of an architectural application or a vehicle application. In the example shown in FIG. 5, the first external surface 432 is exposed to an outside environment 542 (e.g., outdoors), and the second external surface 434 is exposed to an inside environment 544 (e.g., indoors, a vehicle passenger compartment, etc.) so that the panel 400, along with other portions of the structure 540, are an assembly defines a barrier between the outside environment 542 and the inside environment 544. Thus, the panel 400 and the structure 540 cooperate to define the barrier between the outside environment 542 and the inside environment 544.

The first low refractive index layer 424, the second low refractive index layer 426, the first interlayer 428, the second interlayer 430, the third interlayer 429, and the fourth interlayer 431 are located within the panel 400 between the first external glass layer 420 and the second external glass layer 422. In the illustrated implementation, the first low refractive index layer 424 and the second low refractive index layer 426 are positioned on first and second sides of the light guide layer 104, respectively. The third interlayer 429 and the fourth interlayer 431 are optional, dependent upon the material used from the first low refractive index layer 424 and the second low refractive index layer 426. The third interlayer 429 may be positioned between the light guide layer 104 and the first low refractive index layer 424, or the third interlayer 429 may be omitted, in which case the first low refractive index layer 424 is adjacent to and in direct contact with the light guide layer 104. The fourth interlayer 431 may be positioned between the light guide layer 104 and the second low refractive index layer 426, or the fourth interlayer 431 may be omitted, in which case the second low refractive index layer 426 is adjacent to and in direct contact with the light guide layer 104.

The first interlayer 428 is positioned between the first low refractive index layer 424 and the first external glass layer 420. The second interlayer 430 is positioned between the second low refractive index layer 426 and the second external glass layer 422. Thus, the first interlayer 428 may be adjacent to the first external glass layer 420 and the first low refractive index layer 424, and the second interlayer 430 may be adjacent to the second external glass layer 422 and the second low refractive index layer 426.

The first low refractive index layer 424 and the second low refractive index layer 426 facilitate total internal reflection in the light guide layer 104 by maintaining the input light 106 inside the light guide layer 104 except when it is scattered by the phase separated material of the light guide layer 104 as previously described. The first low refractive index layer 424 and the second low refractive index layer 426 have a lower refractive index than an effective refractive index of the light guide layer 104. Materials that can be used for the first low refractive index layer 424 and the second low refractive index layer 426 include low refractive index layers that are positioned adjacent to the light guide layer, such as air (e.g., by defining an air gap using spacers), optically clear adhesives, and low refractive index plastic films.

The first interlayer 428 and the second interlayer 430 function to interconnect the surrounding layers as part of a laminated structure. The first interlayer 428 and the second interlayer 430 may be transparent or translucent resins or other adhesive materials, such as polyvinyl butyral (PVB), thermoplastic polyurethane (TPU), ethylene-vinyl acetate (EVA), an optically clear adhesive (OCA), or a pressure sensitive adhesive (PSA).

The third interlayer 429 and the fourth interlayer 431 function to interconnect the surrounding layers as part of a laminated structure. The third interlayer 429 and the fourth interlayer 431 may be transparent or translucent resins or other adhesive materials, such as polyvinyl butyral (PVB), thermoplastic polyurethane (TPU), ethylene-vinyl acetate (EVA), an optically clear adhesive (OCA), or a pressure sensitive adhesive (PSA). The third interlayer 429 and the fourth interlayer 431 have low refractive indices to facilitate total internal reflection in the light guide layer 104 as described with respect to the first low refractive index layer 424 and the second low refractive index layer 426.

In some implementations, the panel 400 may have a controllable light transmission characteristic by incorporate of a controllable light transmission layer. For example, an electrically responsive film or coating may be applied to an interior surface of the first external glass layer 420 or the second external glass layer 422 and supplied with an electric current by electrodes. The controllable light transmission layer may be a switchable tint layer (e.g., switchable between clear or tinted), a switchable haze layer (e.g., switchable between clear and hazy), or a switchable mirror layer (e.g., switchable between non-reflective and mirror-like reflection).

Figure 6:
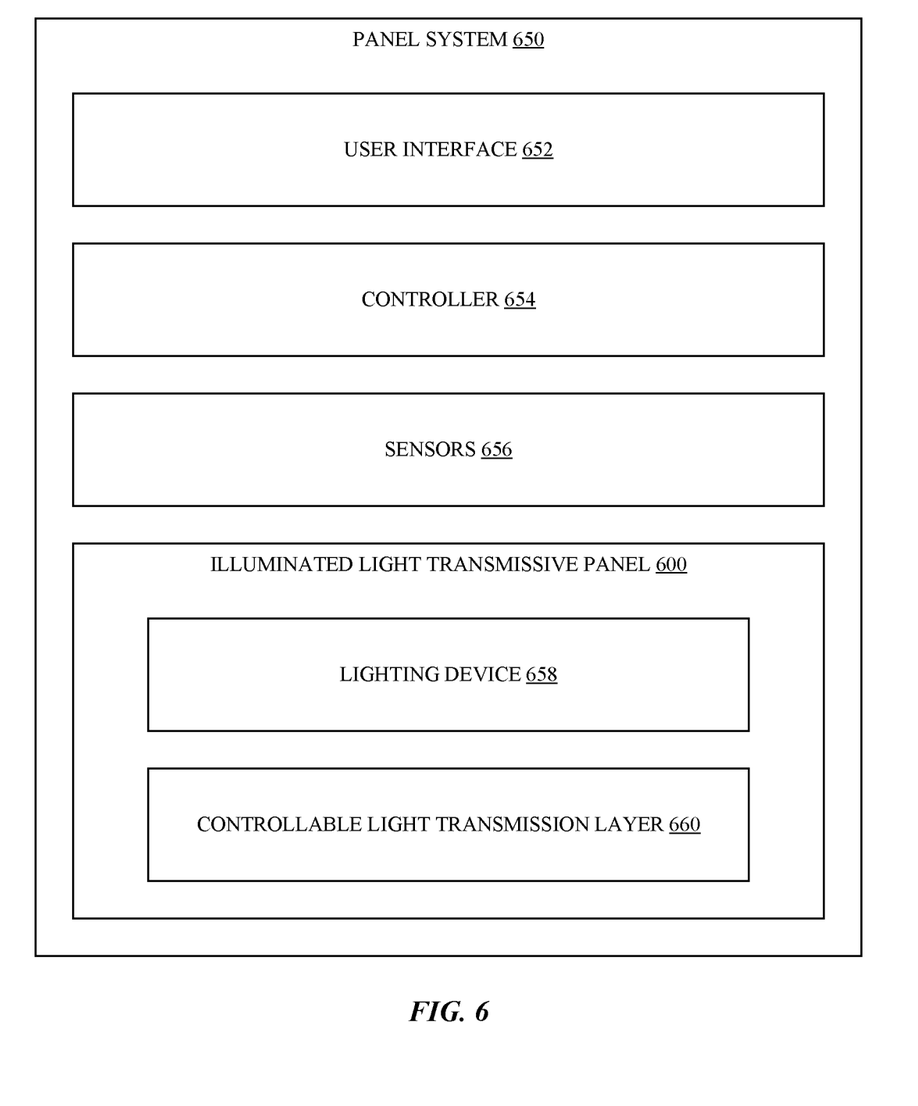
FIG. 6 is a block diagram of a panel system.

FIG. 6 is a block diagram that shows a panel system 650. The features described wither respect to the panel system 650 may be incorporated in or used with the panel 100 or the panel 400. The panel system 650 can include a user interface 652, a controller 654, sensors 656, and an illuminated light transmissive panel 600 that is similar to the panel 100 and/or the panel 400, as previously described. The illuminated light transmissive panel 600 may include a lighting device 658 similar to the lighting device 102 and may include a controllable light transmission layer 660 as described with respect to the panel 400. Technologies that may be used to implement the controllable light transmission layer 660 include switchable components such as suspended particle devices, electrochromic devices, polymer dispersed liquid crystal devices, and guest host liquid crystal devices.

The user interface 652 allows a user to modify aspects of the operation of the panel system 650 and to set a desired state for the panel system 650. The user interface 652 may allow a user to set a state of illumination, by controlling the lighting device 658 to be on or off, by setting an intensity of the lighting device 658, by setting a hue of the lighting device 658, and/or by setting a color temperature of the lighting device 658. The user interface 652 may allow a user to set a controllable light transmission characteristic using the controllable light transmission layer 660. Thus, the user interface 652 can allow modification of operating parameters of the illuminated light transmissive panel 600, for example, based on user preferences.

The controller 654 coordinates operation of the illuminated light transmissive panel 600 by communicating electronically (e.g., using wired or wireless communications) with the user interface 652, the sensors 656, and the illuminated light transmissive panel 600. The controller 654 may receive information (e.g., signals and/or data) from the user interface 652, from the sensors 656, and/or from other components of the illuminated light transmissive panel 600.

The sensors 656 may capture or receive information related, as example, to an external environment where the illuminated light transmissive panel 600 is located or to an internal environment where the illuminated light transmissive panel 600 is located. The external environment can be an exterior a building or a vehicle, and the internal environment can be in the interior of a building or a vehicle. Information captured or received by the sensors 656 can relate to weather, external illumination, internal illumination, or other features.

The controller 654 of the illuminated light transmissive panel 600 can control the lighting device 658 in accordance with user inputs form the user interface 652 or in accordance with sensor outputs from the sensors 656, such as by changing an illumination state or intensity based on sensed external or internal illumination states. The controller 654 of the illuminated light transmissive panel 600 can control the controllable light transmission layer 660 in accordance with user inputs form the user interface 652 or in accordance with sensor outputs from the sensors 656. The illuminated light transmissive panel 600 can change an amount of light transmission by or through the illuminated light transmissive panel 600 based on a control signal, such as a signal from the controller 654. The control signal may cause the illuminated light transmissive panel 600 to modify a current light transmission characteristic, for example, from a first light transmission value to a second light transmission value that is different than the first light transmission value, or from a light transmitting state to a light blocking or reflecting (mirror) state.

Figure 7:
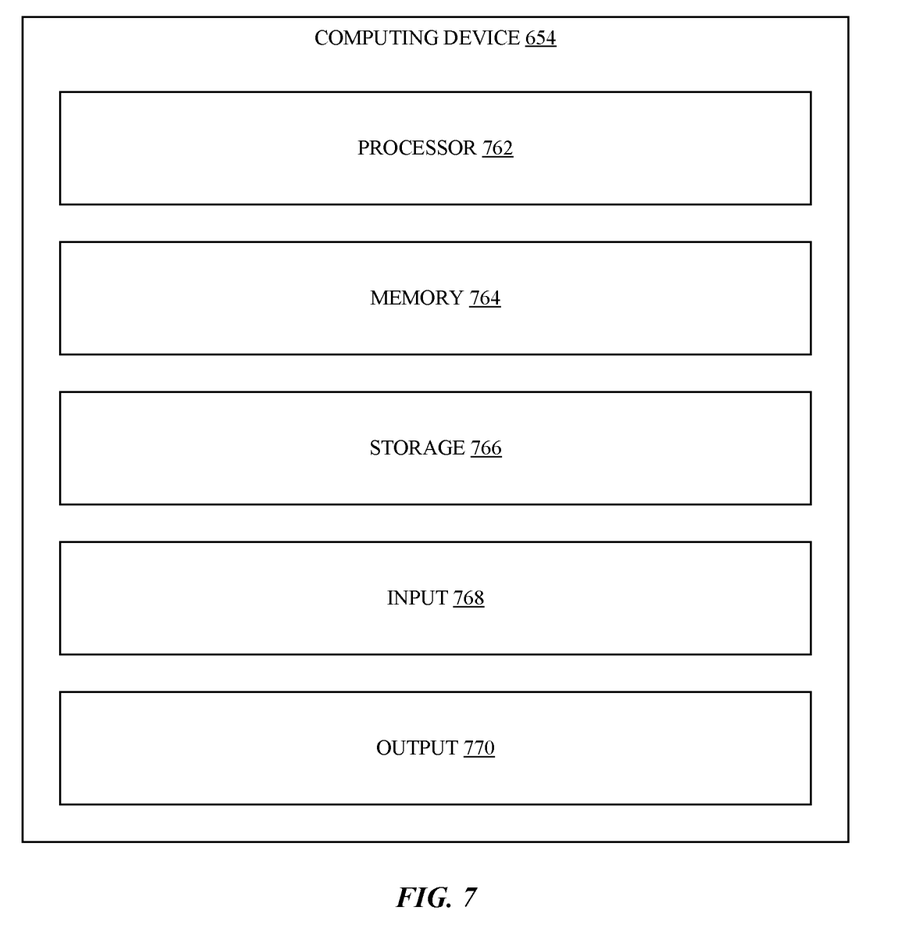
FIG. 7 is an illustration of an example of a hardware configuration for a controller.

FIG. 7 shows an example of a hardware configuration for the controller 654. In the illustrated example, the controller 654 includes a processor 762, a memory device 764, a storage device 766, one or more input devices 768, and one or more output devices 770. These components may be interconnected by hardware such as a bus that allows communication between the components.

The processor 762 may be a conventional device such as a central processing unit and is operable to execute computer program instructions and perform operations described by the computer program instructions. The memory device 764 may be a volatile, high-speed, short-term information storage device such as a random-access memory module. The storage device 766 may be a non-volatile information storage device such as a hard drive or a solid-state drive. The input devices 768 may include sensors and/or any type of human-machine interface, such as buttons, switches, a keyboard, a mouse, a touchscreen input device, a gestural input device, or an audio input device. The output devices 770 may include any type of device operable to provide an indication to a user regarding an operating state, such as a display screen, a light-control panel, or an audio output.

As described above, one aspect of the present technology is the gathering and use of data available from various sources, such as from sensors or user profiles, to improve the function of illuminated light transmitting panels that include controllable elements such as lighting devices, variable tint, switchable mirrors, and/or other active features. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of personal information data, in the present technology, can be used to the benefit of users. For example, the personal information data can be used to deliver changes to light-transmission through illuminated light transmitting panels to best match user lighting preferences. Other uses for personal information data that benefit the user are also possible. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of user-profile-based light transmission through an illuminated light transmitting panels, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can be implemented without the need for accessing such personal information data. That is, the various embodiments of the present technology are not rendered inoperable due to the lack of all or a portion of such personal information data. For example, control of active features of illuminated light transmitting panels can be implemented for a given user by inferring user preferences based on non-personal information data, a bare minimum amount of personal information, other non-personal information available to the device, or publicly available information.

What is claimed is:

1. A light transmitting panel, comprising:
a lighting device that emits an input light; and
a light guide layer formed from a phase separated glass material that includes a first material phase and a second material phase, wherein the first material phase functions to guide the input light along the light guide layer and the second material phase functions to scatter the input light so that at least part of the input light is directed out of the light guide layer as an output light.

2. The light transmitting panel of claim 1, wherein the light guide layer includes a peripheral edge, a first surface, and a second surface, the input light enters the light guide layer at the peripheral edge of the light guide layer, and the output light exits the light guide layer at one of the first surface or the second surface.

3. The light transmitting panel of claim 1, wherein the first material phase and the second material phase have different indices of refraction.

4. The light transmitting panel of claim 1, wherein the second material phase defines discontinuous microstructures that are suspended in the first material phase.

5. The light transmitting panel of claim 1, wherein the second material phase defines droplet-type microstructures in the first material phase.

6. The light transmitting panel of claim 1, wherein the second material phase defines spinodal-type microstructures in the first material phase.

7. The light transmitting panel of claim 1, wherein the light guide layer is formed from a borosilicate glass material.

8. The light transmitting panel of claim 1, wherein the light guide layer is at least one of transparent or translucent.

9. The light transmitting panel of claim 1, wherein the light guide layer is a portion of a window, a first surface of the light guide layer is oriented toward an exterior environment, and a second surface of the light guide layer is oriented toward an interior environment.

10. The light transmitting panel of claim 1, wherein:
the light guide layer includes a peripheral edge,
the light guide layer includes a first surface,
the light guide layer includes a second surface,
the first surface is spaced from the second surface by a thickness dimension of the light guide layer,
the input light enters the light guide layer at the peripheral edge of the light guide layer,
the output light exits the light guide layer at one of the first surface or the second surface,
the first material phase and the second material phase have different indices of refraction,
the second material phase defines microstructures that are suspended in the first material phase,
the light guide layer is at least one of transparent or translucent, and
the lighting device includes light-emitting diodes that are located adjacent to the peripheral edge of the light guide layer.

11. A light transmitting panel, comprising:
a first external glass layer;
a second external glass layer;
a first low refractive index layer located between the first external glass layer and the second external glass layer;
a second low refractive index layer located between the first external glass layer and the second external glass layer; and
a lighting device that emits an input light; and
a light guide layer located between the first low refractive index layer and the second low refractive index layer, wherein the light guide layer is formed from a phase separated glass material that includes a first material phase and a second material phase, wherein the first material phase functions to guide the input light along the light guide layer and the second material phase functions to scatter the input light so that at least part of the input light is directed out of the light guide layer as an output light.

12. The light transmitting panel of claim 11, further comprising:
a first interlayer between the first low refractive index layer and the first external glass layer; and
a second interlayer between the second low refractive index layer and the second external glass layer.

13. The light transmitting panel of claim 11, wherein the light guide layer includes a peripheral edge, a first surface, and a second surface, the input light enters the light guide layer at the peripheral edge of the light guide layer, and the output light exits the light guide layer at one of the first surface or the second surface.

14. The light transmitting panel of claim 11, wherein the first material phase and the second material phase have different indices of refraction.

15. The light transmitting panel of claim 11, wherein the second material phase defines microstructures that are suspended in the first material phase.

16. The light transmitting panel of claim 11, wherein the second material phase defines droplet-type microstructures in the first material phase.

17. The light transmitting panel of claim 11, wherein the second material phase defines spinodal-type microstructures in the first material phase.

18. The light transmitting panel of claim 11, wherein the first external glass layer, the second external glass layer, the first low refractive index layer, the second low refractive index layer, and the light guide layer are each at least one of transparent or translucent.

19. An assembly comprising:
a structure; and
a light transmitting panel connected to the structure so that the structure and the light transmitting panel cooperate to define a barrier between an outside environment and an inside environment, the light transmitting panel including:
a lighting device that emits an input light, and
a light guide layer formed from a phase separated glass material that includes a first material phase and a second material phase, wherein the first material phase functions to guide the input light along the light guide layer and the second material phase functions to scatter the input light so that at least part of the input light is directed out of the light guide layer as an output light.

20. The assembly of claim 19, wherein:
the light guide layer includes a peripheral edge,
the light guide layer includes a first surface,
the light guide layer includes a second surface,
the first surface is spaced from the second surface by a thickness dimension of the light guide layer,
the input light enters the light guide layer at the peripheral edge of the light guide layer, the output light exits the light guide layer at one of the first surface or the second surface, the first material phase and the second material phase have different indices of refraction, the second material phase defines microstructures that are suspended in the first material phase, the light guide layer is at least one of transparent or translucent, and the lighting device includes light-emitting diodes that are located adjacent to the peripheral edge of the light guide layer.

21. The light transmitting panel of claim 1, wherein the first material phase functions to guide the input light in a direction that is generally transverse to a thickness dimension of the light guide layer, by total internal reflection within the light guide layer between a first surface and a second surface, and wherein the second material phase functions to scatter the input light so that at least part of the input light is directed through one of the first surface or the second surface.

22. The light transmitting panel of claim 1, wherein the first material phase forms a majority of the light guide layer by volume.

\* \* \* \* \*